(12) United States Patent
Marhold

(10) Patent No.: US 8,402,671 B1
(45) Date of Patent: Mar. 26, 2013

(54) MEASURING ASSISTANCE DEVICE

(76) Inventor: Scott Marhold, Waxahachie, TX (US)

( * ) Notice: Subject to any disclaimer, the term of this patent is extended or adjusted under 35 U.S.C. 154(b) by 0 days.

(21) Appl. No.: 13/613,711

(22) Filed: Sep. 13, 2012

Related U.S. Application Data

(63) Continuation of application No. 13/539,080, filed on Jun. 29, 2012, now abandoned, which is a continuation-in-part of application No. 13/118,357, filed on May 27, 2011, now abandoned.

(51) Int. Cl.
*G01B 3/10* (2006.01)
(52) U.S. Cl. ............... 33/758; 33/1 LE; 33/760
(58) Field of Classification Search .................... 33/758, 33/1 LE, 757, 760, 770, 413
See application file for complete search history.

(56) References Cited

U.S. PATENT DOCUMENTS

| | | |
|---|---|---|
| 2,853,785 A | 9/1958 | Raifsnider |
| 3,122,836 A | 3/1964 | Aciego |
| 3,145,477 A | 8/1964 | Morrison |
| 3,662,471 A | 5/1972 | Lynde |
| 4,353,167 A | 10/1982 | Martin |
| 4,442,610 A * | 4/1984 | Owens, Jr. ........................ 33/392 |
| 4,921,507 A * | 5/1990 | Beyer .............................. 33/413 |
| 5,022,158 A | 6/1991 | Beyer |
| 5,079,848 A | 1/1992 | Oshiro et al. |
| 5,873,174 A * | 2/1999 | Kraft .............................. 33/758 |
| 6,360,445 B1 | 3/2002 | Haas |
| 6,427,358 B1 | 8/2002 | LeBon et al. |
| 6,578,274 B1 | 6/2003 | Tango, Jr. et al. |
| 7,690,125 B2 | 4/2010 | Lenz |
| 7,913,409 B2 * | 3/2011 | Wilson ............................ 33/414 |
| 8,191,277 B2 * | 6/2012 | Donovan et al. ................ 33/758 |
| 2002/0026723 A1 * | 3/2002 | Savalla ........................... 33/414 |
| 2004/0221469 A1 * | 11/2004 | Risher ............................. 33/760 |

* cited by examiner

*Primary Examiner* — Christopher Fulton
(74) *Attorney, Agent, or Firm* — Carr LLP

(57) ABSTRACT

A device comprising a body, having a cavity extending therethrough from a top surface to a bottom surface, may comprise a massive core enclosed by a cover. A recessed area on the top surface adjacent the cavity extends from the cavity to a perimeter of the body. A designated edge between the cavity and the recessed area is located a predetermined distance from an opposite perimeter. A releasable fastener or clamping device may be provided at the recessed area. A top and bottom post may be coupled together in a center hole in the body, to provide a center post from which to measure. Markings may be provided on the top surface of the body for measuring at an angle from the center. Small grooves may be provided in side surfaces of the body for aligning the device with lines or markings on the floor.

26 Claims, 18 Drawing Sheets

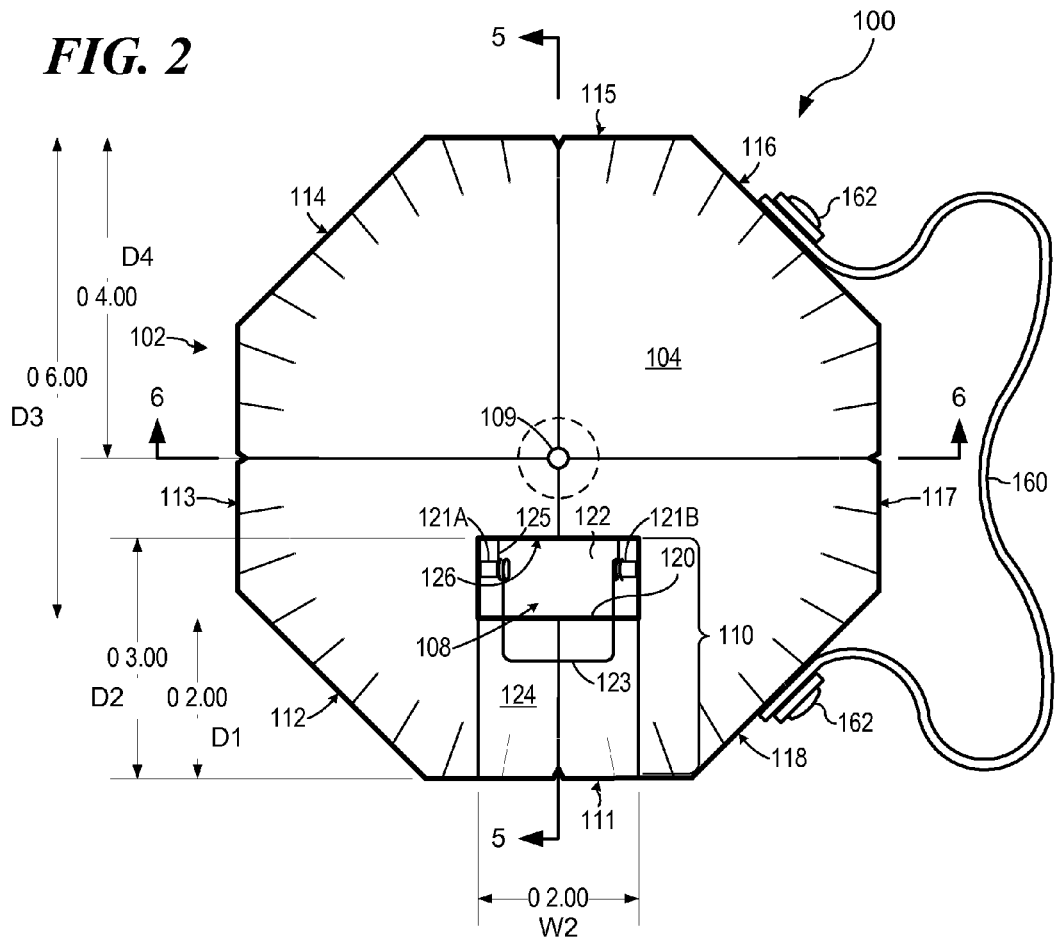
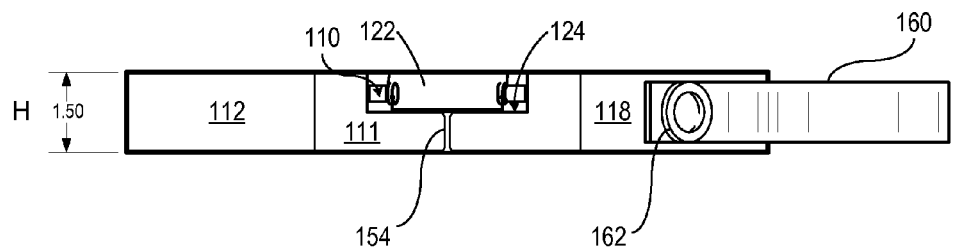

MEASURING ASSISTANCE DEVICE

CROSS-REFERENCE TO RELATED APPLICATIONS

This application is a continuation of U.S. patent application Ser. No. 13/539,080, entitled MEASURING ASSISTANCE DEVICE, filed Jun. 29, 2012, now abandoned which is a continuation-in-part of, and claims the benefit of the filing date of, U.S. patent application Ser. No. 13/118,357 entitled MEASURING ASSISTANCE DEVICE, filed May 27, 2011 now abandoned.

BACKGROUND OF THE INVENTION

1. Field of the Invention

The present invention relates to measuring devices and, more particularly, to a device for securing a measuring tape or chalk line.

2. Description of the Related Art

Measuring tapes are used to measure linear distances from a first chosen location to a second chosen location. Retractable measuring tapes are generally provided with a hook on one end for securing that end to the first chosen location while the measuring tape is extended to the second chosen location. Many measuring tapes are provided with spring-loaded retracting mechanisms operable to retract the length of the measuring tape into a housing unless the tape is positively extended from the housing. Other measuring tapes may be provided with a cranking mechanism having a handle for retracting the measuring tape into its housing. In either case, it is desirable to secure one end of the measuring tape to the first chosen location so the measuring tape can be extended the distance to the second chosen location. In circumstances in which the distance to the second location exceeds the extended arm length of a user, or in circumstances in which there is no convenient feature upon which to hook or otherwise secure one end of the measuring tape at the first location, it is helpful to have an assistant hold one end of the measuring tape while the user extends the measuring tape to make a measurement. In certain instances, a measurement may need to be taken when there is no one available to assist in the measuring. In such instances, a workaround solution may be to use a brick or other relatively heavy object to secure one end of the measuring tape to the first chosen location. Another workaround solution may be to drive a temporary stake, such as a section of steel reinforcing bar (rebar), into the ground to secure a looped end of a long measuring tape to the first chosen location. Unfortunately, objects such as a brick or other relatively heavy object may be unavailable or unsuited to the particular measurement. It would be desirable to have a device which could be used to secure one end of a measuring tape at a desired location so that a user could take a measurement from that location without the need for another person to assist in the measurement.

A chalk line is a commonly used construction tool for marking a straight line on a surface such as a floor. Although a chalk line is usually provided with a hook or eyelet feature for securing the one end at a first chosen location, often there is no suitable feature at the first chosen location for securing the chalk line. In such circumstances, two people are required to operate the chalk line, with one person securing one end of the chalk line at a first chosen location, and another person securing the chalk line at a second chosen location. It would be desirable to have a device which could be used to secure one end of a chalk line at a desired location so that a user could mark a line on the floor without the assistance of another person.

SUMMARY OF THE INVENTION

The present invention provides a device comprising a body, having a cavity extending therethrough from a top surface to a bottom surface. A recessed area on the top surface adjacent the cavity extends from the cavity to a perimeter of the body. A designated edge between the cavity and the recessed area is located a predetermined distance from an opposite perimeter. A releasable fastener or clamping device may be provided at the recessed area. The body may have a massive core enclosed by a cover.

BRIEF DESCRIPTION OF THE DRAWINGS

For a more complete understanding of the present invention and the advantages thereof, reference is now made to the following Detailed Description taken in conjunction with the accompanying drawings, in which:

FIG. 2 is a top view of a measuring assistance device according to an aspect of the present invention;

FIG. 3 is a front side view of a measuring assistance device according to an aspect of the present invention;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

Figure 1:
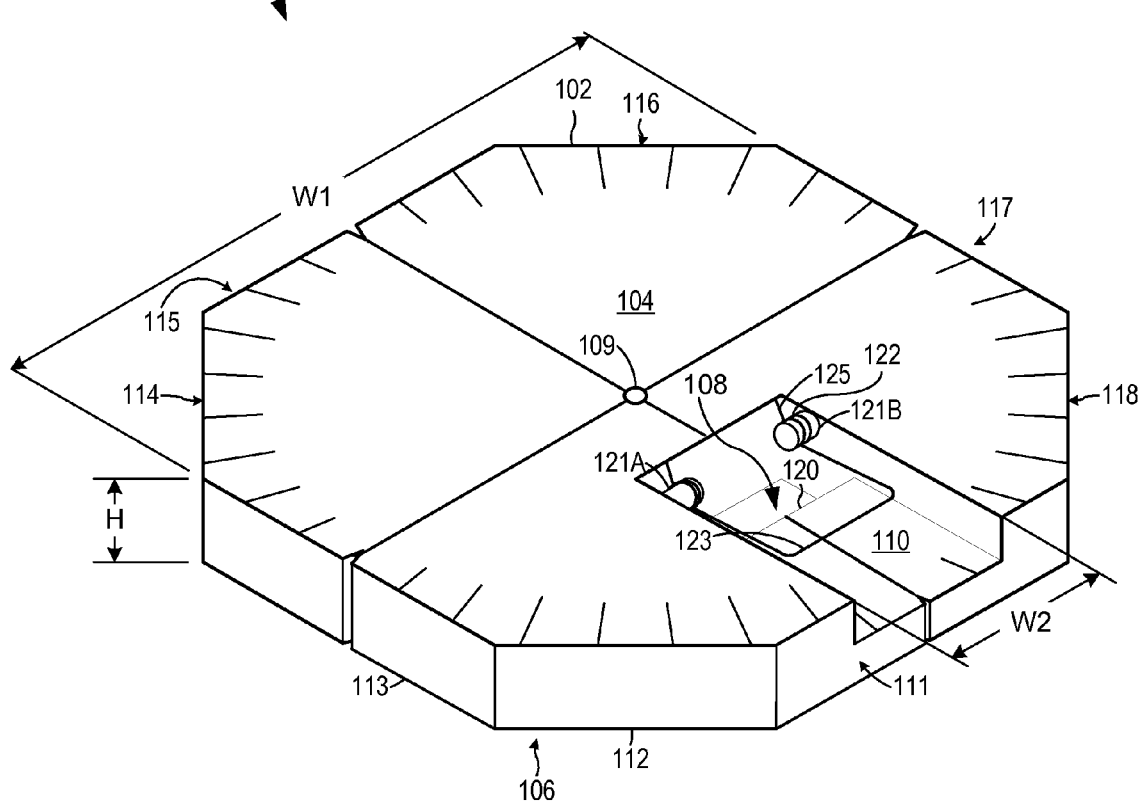
FIG. 1 is a perspective view of a measuring assistance device according to an aspect of the invention.

Turning now to FIG. 1, the reference numeral 100 generally indicates a measuring assistance device in accordance with one aspect of the present invention. In this embodiment, the measuring assistance device 100 comprises a body 102 having a regular, polygonal shape, such as an octagon, when viewed from above. The body 102 may be made of cast iron, and galvanized or coated in such a way that it will not rust. Any and all metal components attached to or used with the measuring assistance device 100 are preferably rust-proof. Alternatively, the body 102 can be made of other durable, rust-proof materials of sufficient mass that the body 102 will weigh approximately 15 pounds, or within the range of 15 to 16 pounds, and have a surface area on an underside thereof in the range of 50 to 60 sq. in. The body 102 should preferably have sufficient mass and surface area that the device will resist being moved while measurements are taken with one end of a measuring tape secured to the device 100. Preferably, the inertia of the device, together with friction between the device and an underlying surface, should be more than the force exerted by an extended measuring tape will normally overcome. In this embodiment, the body 102 has an octagonal shape, having a generally planar top surface 104, a generally planar bottom surface 106, and eight generally planar side surfaces 111-118. Body 102 may be eight inches across from one flat side to an opposite flat side, as indicated by the dimension W1, and may be at least one inch tall as indicated by the dimension H, and may be one-and-one-half inches tall.

In an embodiment, a cavity 108 extends clear through the body 102 from top surface 104 through bottom surface 106. As shown in FIG. 1 and also in FIG. 2, cavity 108 may be located off-center of the device 100 and adjacent to a recessed area 110. In an embodiment, recessed area 110 may have a width of approximately two inches as indicated by the dimension W2, and may have a length of two inches as indicated by dimension D1 (FIG. 2). A recessed surface 124 of recessed area 110 may be one-half inch above the bottom surface 106 of the body 102. In the embodiment shown in FIG. 1, recessed area 110 extends from a first side surface 111 towards a center 109 of the body 102 and adjoins cavity 108 at a designated edge 120. The designated edge 120 may be six inches from an opposite side surface 115, as indicated in FIG. 2 by dimension D3. Cavity 108 extends from the designated edge 120 to a far vertical surface 126, which may be located a distance of three inches from first side surface 111 as indicated by dimension D2 (FIG. 2).

In an embodiment, a releasable fastener or clamping device 122 may be provided within the recessed area 110 and cavity 108 for securing one end of a tape measure to designated edge 120. The clamping device 122 may be a coiled wire spring mounted upon posts 121A, 121B, that may be provided extending from opposite side vertical surfaces of the cavity 108. The coiled wire spring may have a stationary portion 125 braced against far vertical surface 126 and having a U-shaped portion 123 extending away from far vertical surface 126 and in the direction of the recessed area 110 for a sufficient distance to reach the recessed surface 124. In an embodiment, the U-shaped portion 123 may extend for a distance of one-and-one-half inch, for example. In this example, clamping device 122 may be configured like the spring-loaded wire in a typical mouse trap, such that the U-shaped portion can be lifted up from recessed surface 124 in order to place one end of a tape measure at designated edge 120, and then released so the U-shaped portion secures the tape measure to recessed surface 124 and the designated edge 120.

Figure 4:
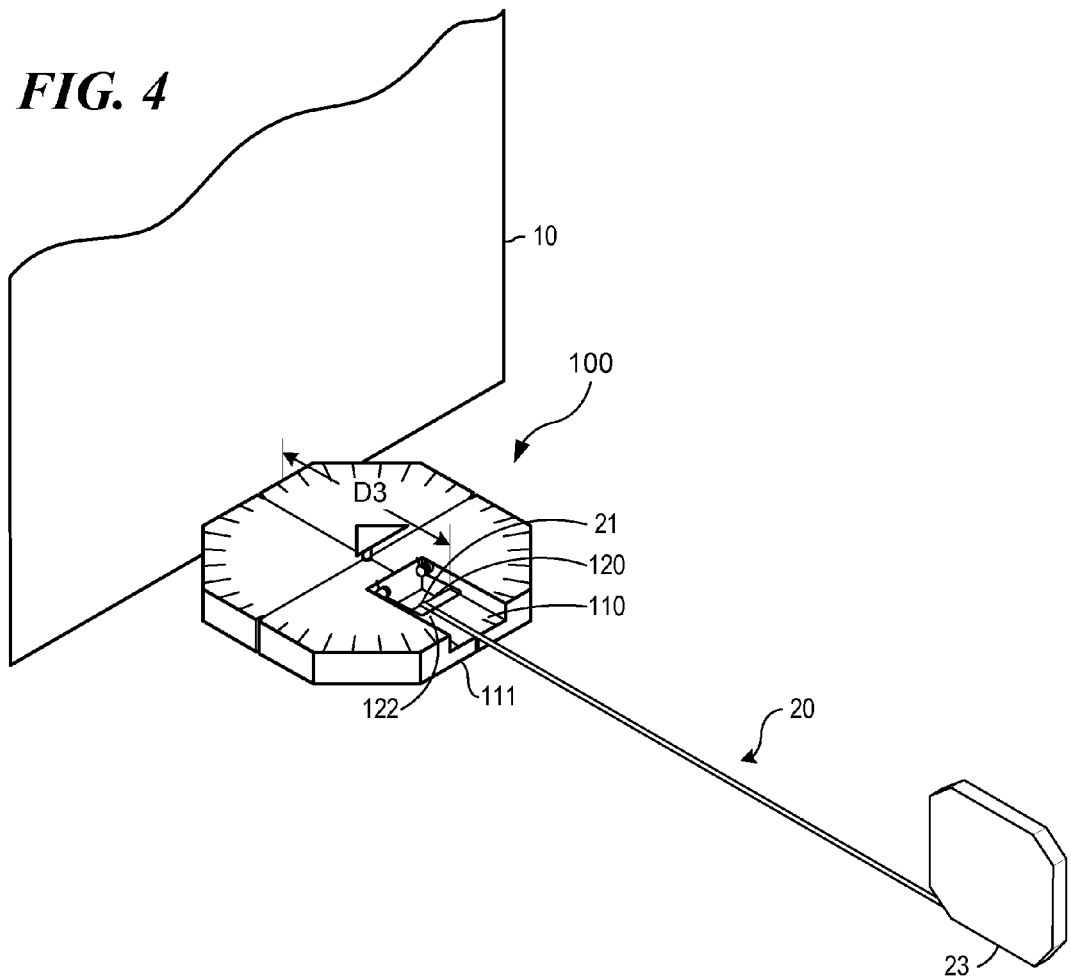
FIG. 4 is a perspective view of a measurement taken with a measuring assistance device according to an aspect of the present invention.

In operation, and as shown in FIG. 4, the measuring assistance device 100 may be placed at a chosen location from which a measurement is to be taken such as, for example, against a wall 10, in a corner, or at some other architectural feature. The measuring assistance device may be oriented such that recessed area 110 extends in the direction in which the measurement is to be taken. When the measuring assistance device is placed against a wall, for example, the first side surface 111 and recessed area 110 would be facing away from the wall and the opposite side surface 115 would be adjacent the wall. One end 21 of a measuring tape 20 may be secured to designated edge 120 using clamping device 122. The other end of measuring tape 20 may be extended some distance to obtain a measurement. Since the designated edge 120 may be located a distance D3 from opposite side 115, the value of D3 should be added to the measurement taken from the measuring tape 20 to obtain the measurement from the wall or other chosen location. The measuring assistance device 100 thereby provides a means of securing one end 21 of a measuring tape 20 at or near a chosen location for the purpose of obtaining a measurement.

The body 102 of the measuring assistance device 100 may be any regular shape, and may for convenience be shaped as a regular octagon in an embodiment. Measurements may be taken from a corner, for example, where the corner is not square the measuring assistance device may still be placed against the two adjoining walls without interference with an irregular corner.

Figure 5:
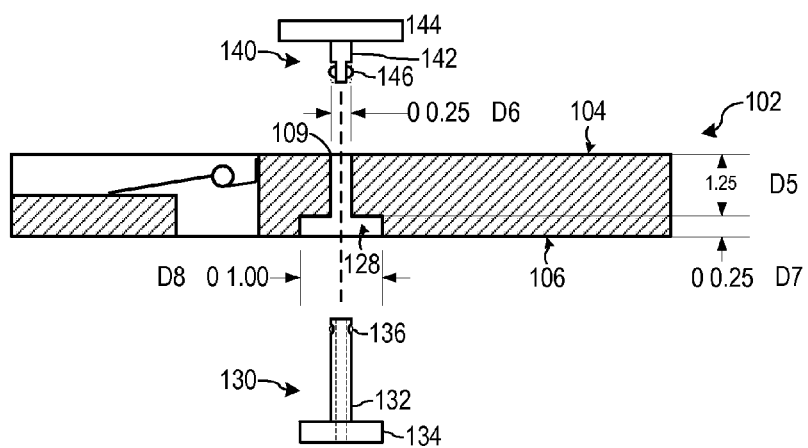
FIG. 5 is a sectional view of a measuring assistance device taken along the lines 5-5 in FIG. 2.
Figure 6A:
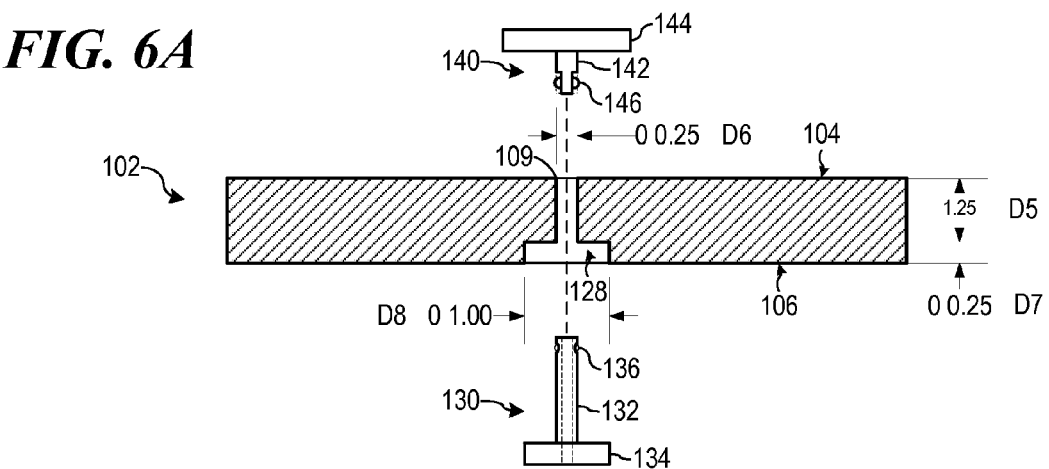
FIG. 6A and FIG. 6B are sections views of a measuring assistance device taken along the lines 6-6 in FIG. 2.
Figure 6B:
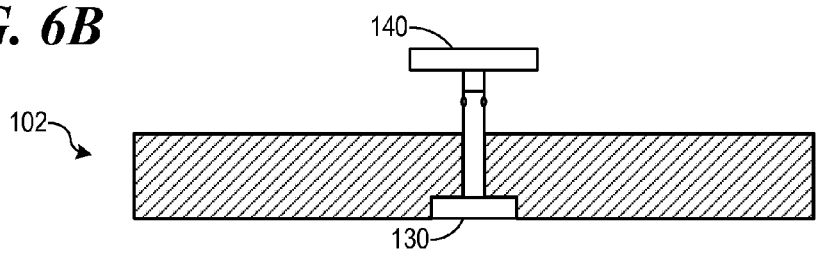

In an embodiment, and as shown in FIG. 2, the body 102 of device 100 may have a center hole 109, located approximately half the width W1 from side surfaces 111-118, or at a distance D4, and extending from top surface 104 clear through bottom surface 106. As shown in FIG. 5, center hole may extend a distance D5 approximately 1.25 inches through the body 102 with a first diameter D6, and thereafter may extend a distance D7 to the bottom surface 106 with a second diameter D8. The second diameter D8 may be greater than the first diameter D6. Referring now to FIG. 6A and FIG. 6B, a bottom post 130, having a shaft portion 132 and a disk portion 134 may be inserted into center hole 109 at a lower opening 128. In an embodiment, shaft portion 132 may extend above the top surface 104 of body 102 when bottom post 130 is fully inserted into center hole 109. A top post 140, having a shaft portion 142 and a plate portion 144 may be coupled to shaft portion 132 of bottom post 130. In an embodiment, a releasable coupling feature may be provided at the distal end of shaft portion 132 of bottom post 130 and of shaft portion 142 of top post 140. In the embodiment shown, the releasable coupling feature may be one or more holes 136 formed in the side of shaft portion 132 of bottom post 130, and which may be positioned to receive one or more depressible protrusions 146 provided in the side of shaft portion 142 of top post 140. In an embodiment, the depressible protrusions 146 may be one or more spring-loaded balls, such as a 'spring clip'. Alternatively, a threaded coupling may be provided at the distal ends of shaft portion 142 of top post 140 and the proximal end of shaft portion 132 of bottom post 130. In an embodiment, the shaft 132 of bottom post 130 may be hollow and open at each end to provide means for locating the device 100 on a mark on the ground.

Figure 7:
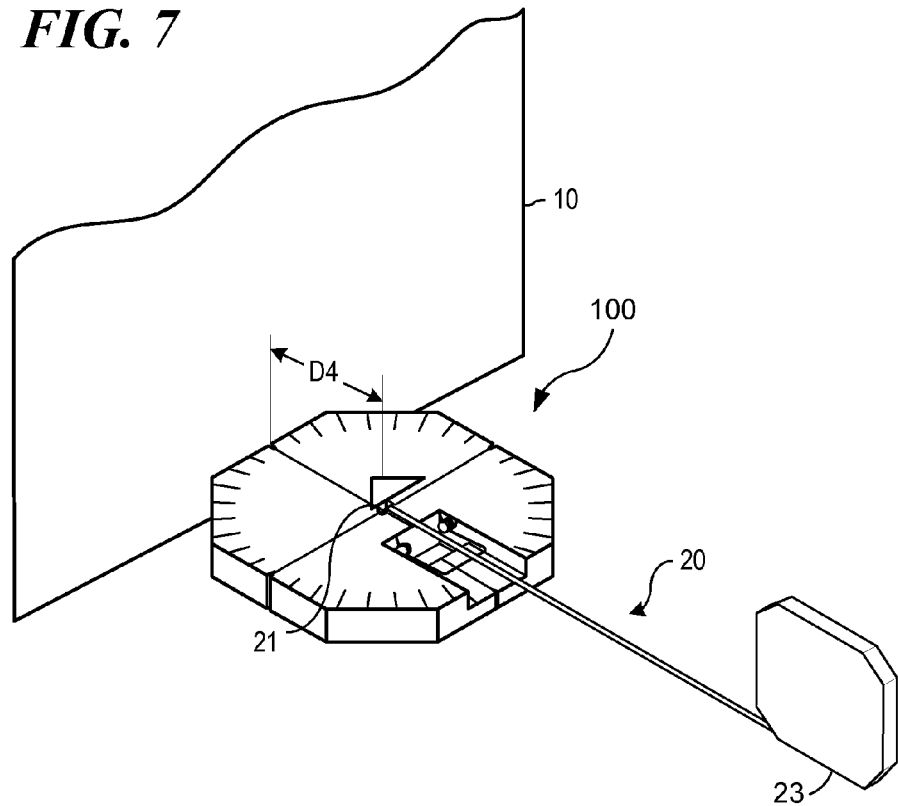
FIG. 7 is a perspective view of another measurement taken with a measuring assistance device according to an aspect of the present invention.

In operation, as shown in FIG. 7, and with reference back to FIG. 6A and FIG. 6B, the device 100 may be placed at a chosen location from which a measurement is to be taken. Bottom post 130 may be fully inserted into center hole 109 through lower opening 128. One end 21 of a measuring tape 20 may be placed over the distal end of shaft portion 132 of bottom post 130, using a measuring tape having a loop at one end. Top post 140 may be secured to bottom post 130 thereby securing one end 21 of measuring tape 20 to device 100. The other end 23 of measuring tape 20 may be extended some distance to obtain a measurement. Where the device 100 is placed adjacent the chosen location, such as against a wall, a corner, or other such architectural feature, the center hole 109 to which one end of measuring may be located half the width W1 from the chosen location. The value of dimension D4 (FIG. 2) should be added to the measurement taken from the measuring tape 20 to obtain the measurement from the wall or other chosen location. The measuring assistance device 100 thereby provides another means of securing one end 21 of a measuring tape 20 at or near a chosen location for the purpose of obtaining a measurement.

Figure 8:
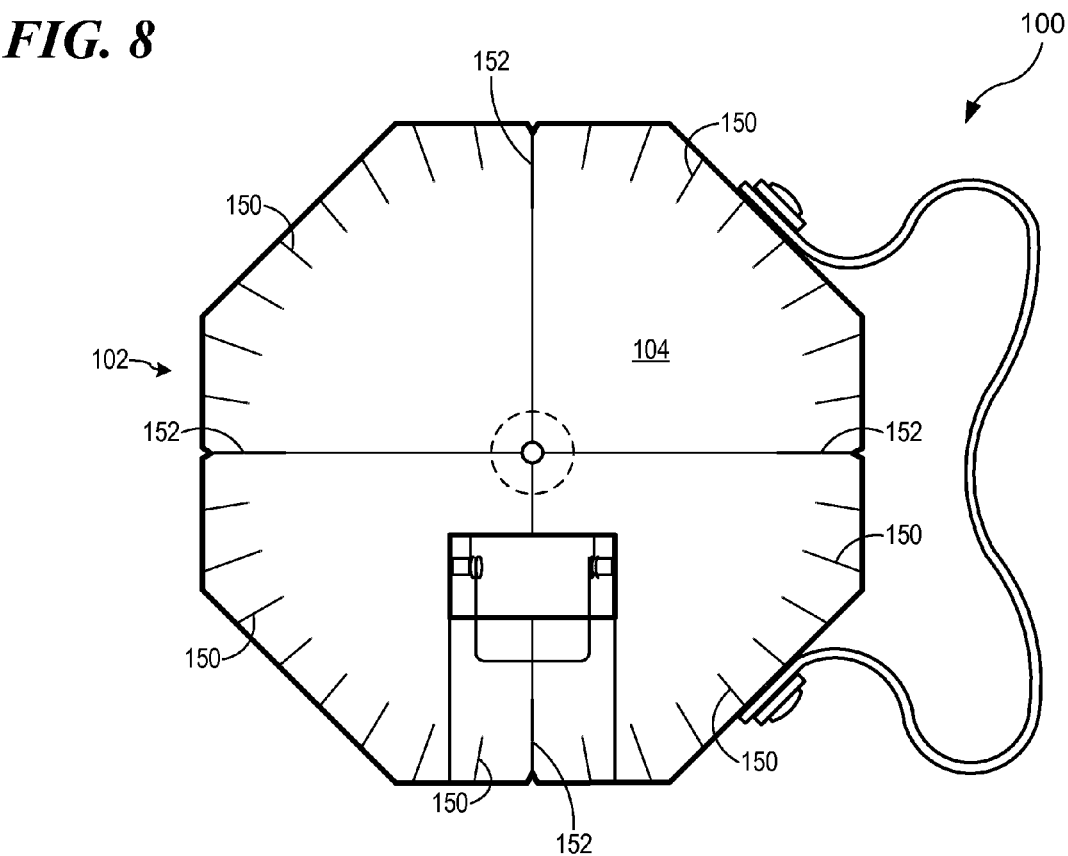
FIG. 8 is a top view of a measuring assistance device according to an aspect of the present invention.
Figure 9:
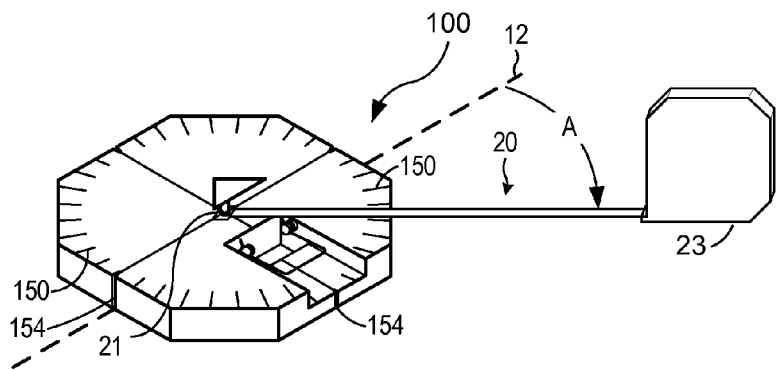
FIG. 9 is a perspective view of a measurement taken at an angle with a measuring assistance device according to an aspect of the present invention.

In an embodiment, and as shown in FIG. 8, the top surface 104 of body 102 may be provided with markings 150 around a perimeter of the device 100. The markings 150 may be painted on the top surface 104, and/or the markings 150 may be raised or depressed areas formed into the top surface 104 in the form of ridges or grooves, respectively. The markings 150 may indicate a bearing from the center hole 109 of device 100, in the direction in which a measurement is to be taken. In an embodiment, the 36 markings 150 may be made evenly around the perimeter of device 100, indicating 10 degree increments. In an embodiment, four of the markings 152 may be a subset of the markings 150 and may be spaced apart in 90 degree increments, may be distinguishable from the other markings, and may be used to indicate four cardinal directions. An embodiment of the device 100, as shown in FIG. 9, provides small grooves 154 formed in side surfaces 111, 113, 115, and 117, adjacent the four markings 152. In operation, the device 100 may be placed in a chosen location and in a particular orientation, and the markings 150 may be used to measure a distance at a certain angle A or bearing with respect to the device 100. In FIG. 9, for example, the device 100 may be aligned with a line 12 marked on a floor, and the device oriented so that grooves 154 on two opposite sides of the device 100 may be aligned with the line 12.

Figure 10:
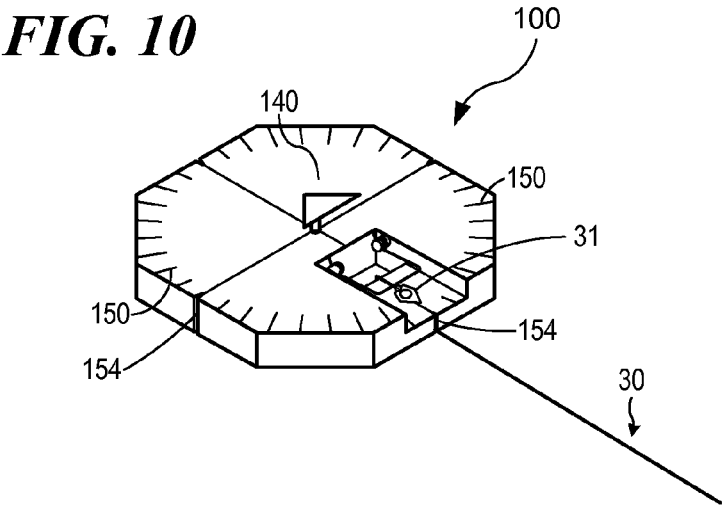
FIG. 10 is a perspective view of a marking being made with a measuring assistance device according to an aspect of the present invention.

The measuring assistance device 100 may also be used with other measuring and marking devices, such as a chalk line 30, as shown in FIG. 10. One end 31 of chalk line 30 may be secured to clamping device 122, the chalk line 30 having been brought up through cavity 108 from the underside 106 of the device 100. The chalk line 30 may then be run under the device 100 and extended some distance. Alternatively, the chalk line 30 may be secured at one end 31 to bottom post 130 or to top post 140, and chalk line 30 may be run under the device 100 such that the weight of the device 100 will secure the chalk line 30 for snapping.

Figure 11:
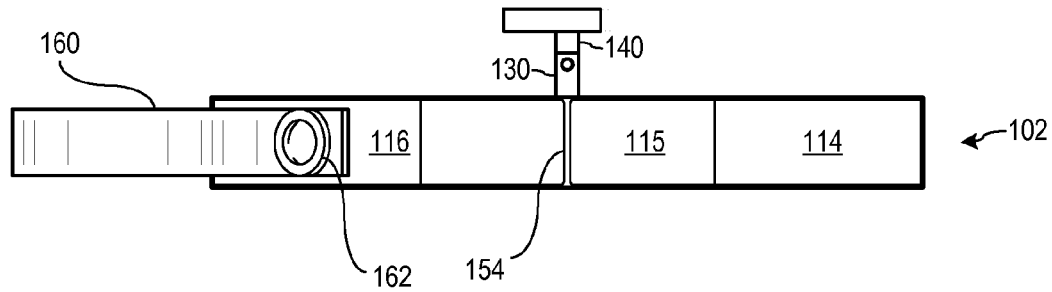
FIG. 11 is a rear side view of a measuring assistance device according to an aspect of the present invention.
Figure 12:
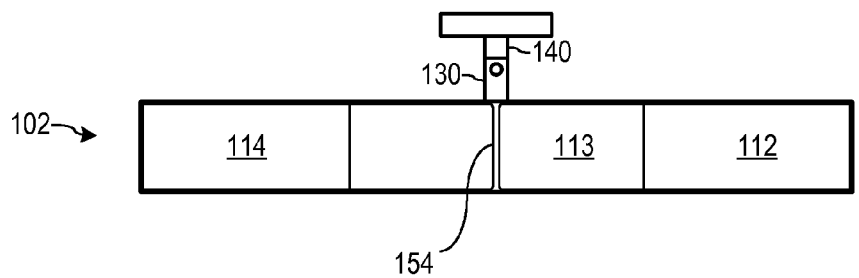
FIG. 12 is a left side view of a measuring assistance device according to an aspect of the present invention.
Figure 13:
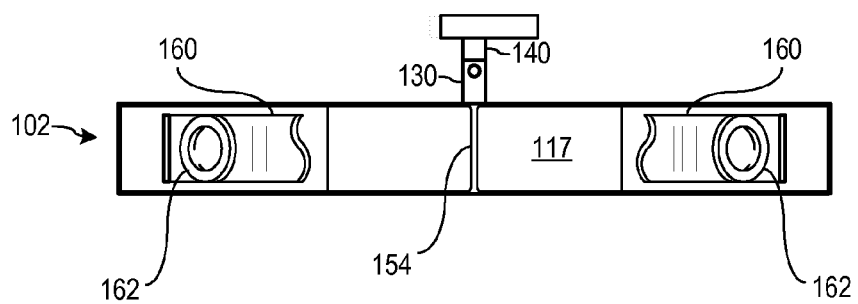
FIG. 13 is a right side view of a measuring assistance device according to an aspect of the present invention.

Turning now to FIG. 11 and FIG. 13, a flexible strap 160 may be secured at each end thereof to the body 102 of device 100 using suitable fasteners 162. The fasteners 162 may be bolts threaded into the body 102 of device 100, or studs press-fit into the body 102, or any other suitable fastener. Strap 160 may advantageously be used to carry the measuring assistance device 100.

Figure 14:
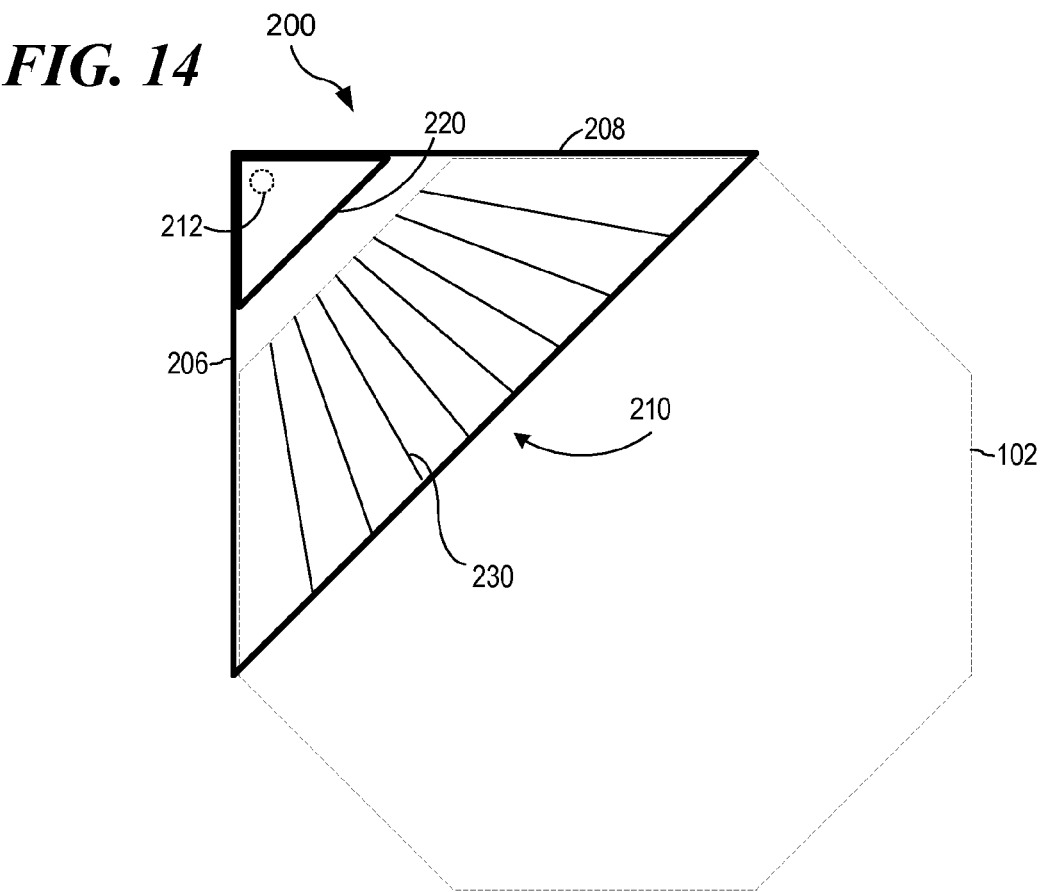
FIG. 14 is a top view of a corner adapter for a measuring assistance device according to an aspect of the present invention.
Figure 15A:
FIG. 15A and FIG. 15B are side views of a corner adapter for a measuring assistance device according to an aspect of the present invention.
Figure 15B:
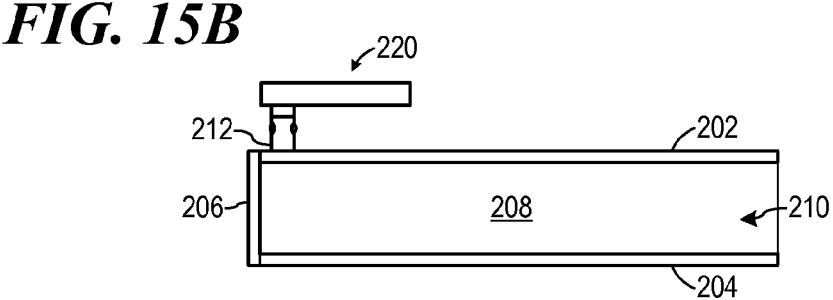

Turning now to FIG. 14, a corner adapter 200 may be a thin metal or plastic sleeve in the shape of a right triangle. For measurements that must be taken from a corner, the corner adapter 200 may be slid over one corner of the body 102 of measuring assistance device 100, as indicated by the dashed lines in FIG. 14. With reference to FIG. 15A and FIG. 15B, an embodiment of the corner adapter 200 may have a top portion 202 and a bottom portion 204 interconnected by a first side portion 206 and a second side portion 208. As shown in FIG. 14 and in FIGS. 15A-15B, the top and bottom portions 202, 204, and the first and second side portions 206 and 208 may be generally planar, and may define an opening 210 having an interior volume in which the body 102 of device 100 may be received. A bottom post 212 may be affixed to top portion 202 of corner adapter 200 at a location near the right-angled corner of the adapter 200. A top post 220, having a shaft portion 216 and a plate portion 218 may be coupled to bottom post 212. In an embodiment, a releasable coupling feature may be provided at the distal end of bottom post 212 and of shaft portion 216 of top post 220. In the embodiment shown, the releasable coupling feature may be one or more holes 214 formed in the side of bottom post 212, and which may be positioned to receive one or more depressible protrusions 222 provided in the side of shaft portion 216 of top post 220. In an embodiment, the depressible protrusions 222 may be one or more spring-loaded balls, such as a 'spring clip'. Alternatively, a threaded coupling may be provided at the ends of bottom post 212 and of shaft portion 216 of top post 220. In an embodiment, the corner adapter 200 may have markings 230 on the top portion 202. The markings 230 may be painted on the top portion 202, and/or may be formed as ridges or grooves in the surface of top portion 202. In an embodiment, the marking 230 are evenly spaced apart every 10 degrees along the opening 210, and may be used to take measurements at an angle with respect to side portions 206 or 208

Figure 16:
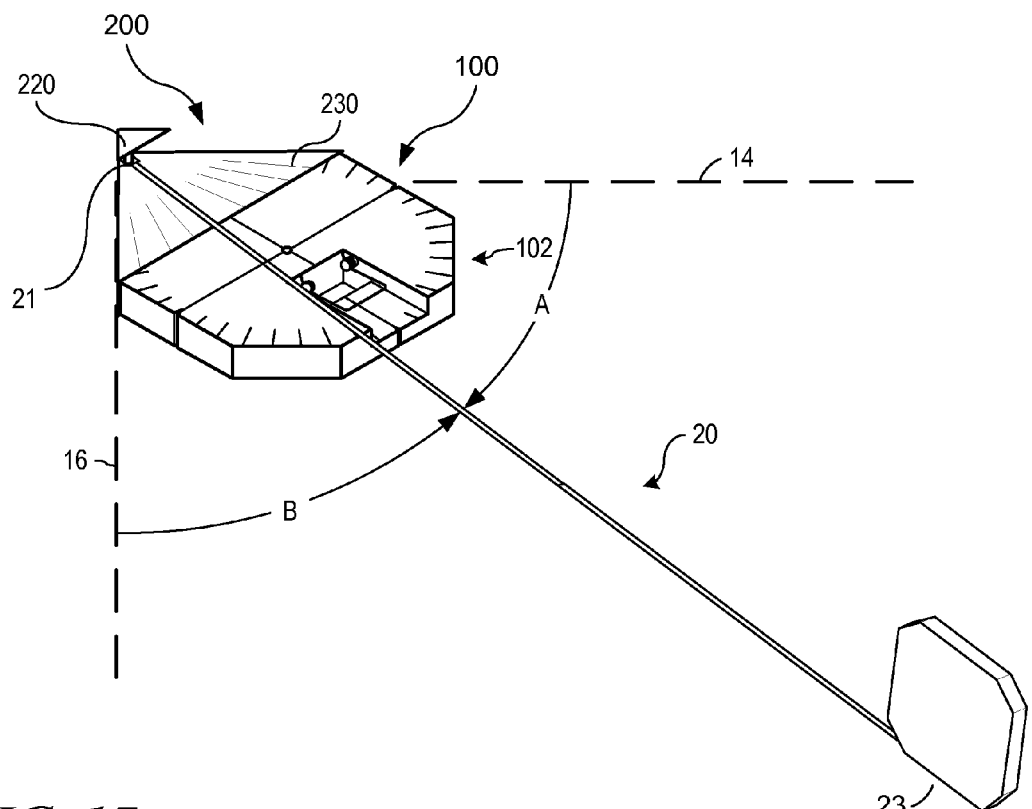
FIG. 16 is a perspective view of a measurement taken at an angle from a corner using a corner adapter for a measuring assistance device according to an aspect of the present invention.

In operation, and as shown in FIG. 16, measurements may be taken from a corner location by placing the corner adapter 200 over a corner of the body 102 of measuring assistance device 100, and placing the device 100 at a chosen, corner location. Such a corner location may be, for example, where two walls 14 and 16 meet to form a corner. A measuring tape 20 may be secured at one end 21 to the top post 220 at a corner of adapter 200. The other end 23 of measuring tape 20 may be extended a distance, at an angle A, or a complementary angle B, as determined from markings 230, to obtain a measurement.

Figure 17:
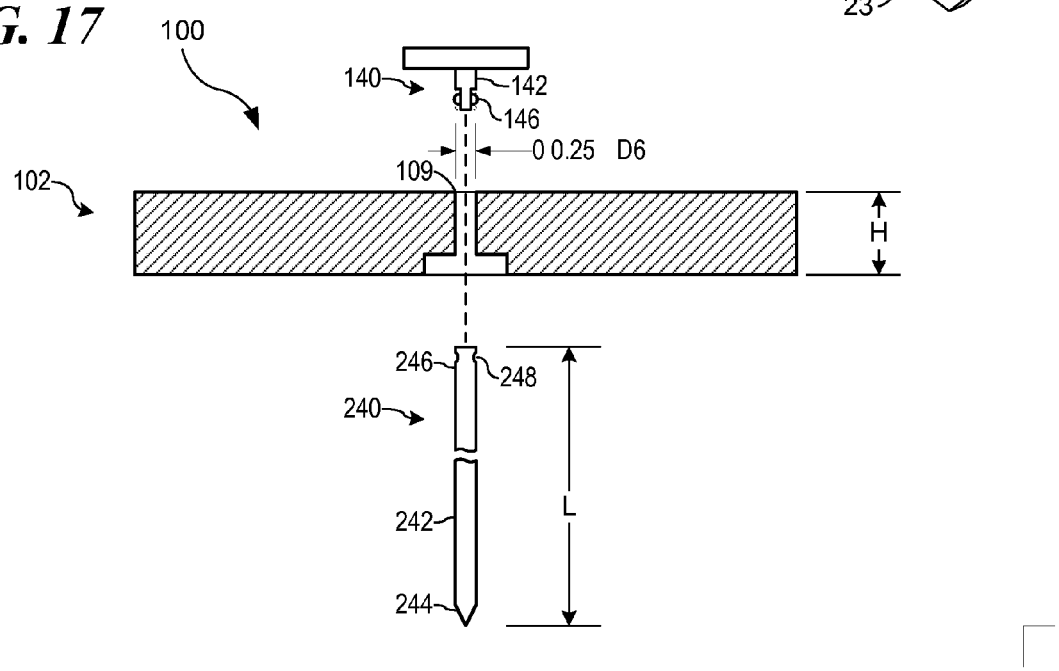
FIG. 17 is a sectional view of a measuring assistance device showing a center stake according to an aspect of the invention.

Turning now to FIG. 17, a center stake 240 may be provided in circumstances in which the device 100 would be placed on the ground, or in areas where there is no concrete, paving, or other floor material. The center stake 240 may have shaft portion 242 having a diameter approximately equal to, or slightly less than, diameter D6 of center hole 109, and may preferably have a length L greater than the height H of the body 102 of device 100. In an embodiment, the center stake 240 may have a length of approximately eight inches, and may be pointed at a distal end 244 for driving the center stake 240 in to the ground. A proximal end 246 of center stake 240 may have a releasable coupling feature for coupling to a top post, such as top post 140 as described above. In an embodiment, the releasable coupling feature may be one or more depressible protrusions 146 provided in the side of shaft portion 142 of top post 140. In an embodiment, the depressible protrusions 146 may be one or more spring-loaded balls, such as a 'spring clip', for coupling with one or more holes 248 formed in the side of shaft portion 246 of center stake 240. Alternatively, a threaded coupling may be provided at the proximal end 246 of center stake 240 for coupling to a threaded end of a top post 140. In operation, center stake 240 may be inserted through center hole 109 in the device 100 and driven into the ground to secure the device 100 at a desired location, and top post 140 may be secured to center stake 240 for securing one end of a measuring tape as described above.

Figure 18:
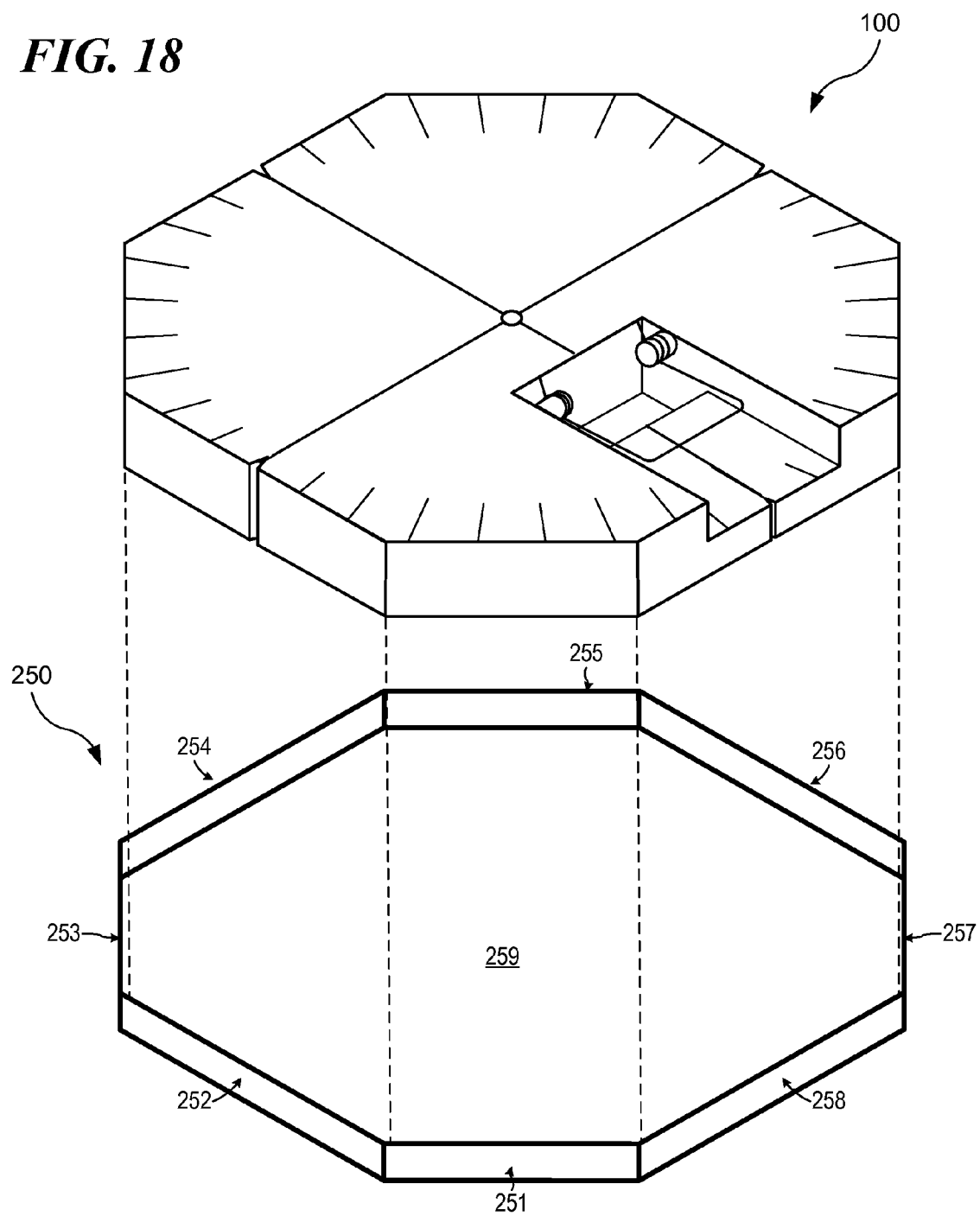
FIG. 18 is a perspective view of a measuring assistance device and a bottom cover according to an aspect of the invention.

Turning now to FIG. 18, a separate bottom cover 250 may be provided for use in circumstances in which the device 100 would be placed on a wet floor. The bottom cover 250 may be fabricated as a slip-on member having a shape generally conforming to the shape of the device 100. In the embodiment shown in FIG. 18, the bottom cover 250 may have an octagonal bottom surface 259 with eight side surfaces 251-258 extending upward. The bottom cover may be fabricated from a resilient material, such as rubber, which may stretch slightly to fit over the bottom surface 106 of device 100 and partially up the side surfaces 111-118 of the device 100. The bottom cover 250 may be fabricated from a relatively flexible rubber-like material that may be easily folded when not in use, or may be fabricated from a relatively rigid rubber-like material that forms a dish-like member which retains its shape when not in use. In operation, the bottom cover 250, having a surface area of approximately 53 sq. in., may enhance friction between the device 100 and an underlying surface such that the device 100 and the bottom cover 250 resist slipping or sliding on a damp or wet floor.

Figure 19:
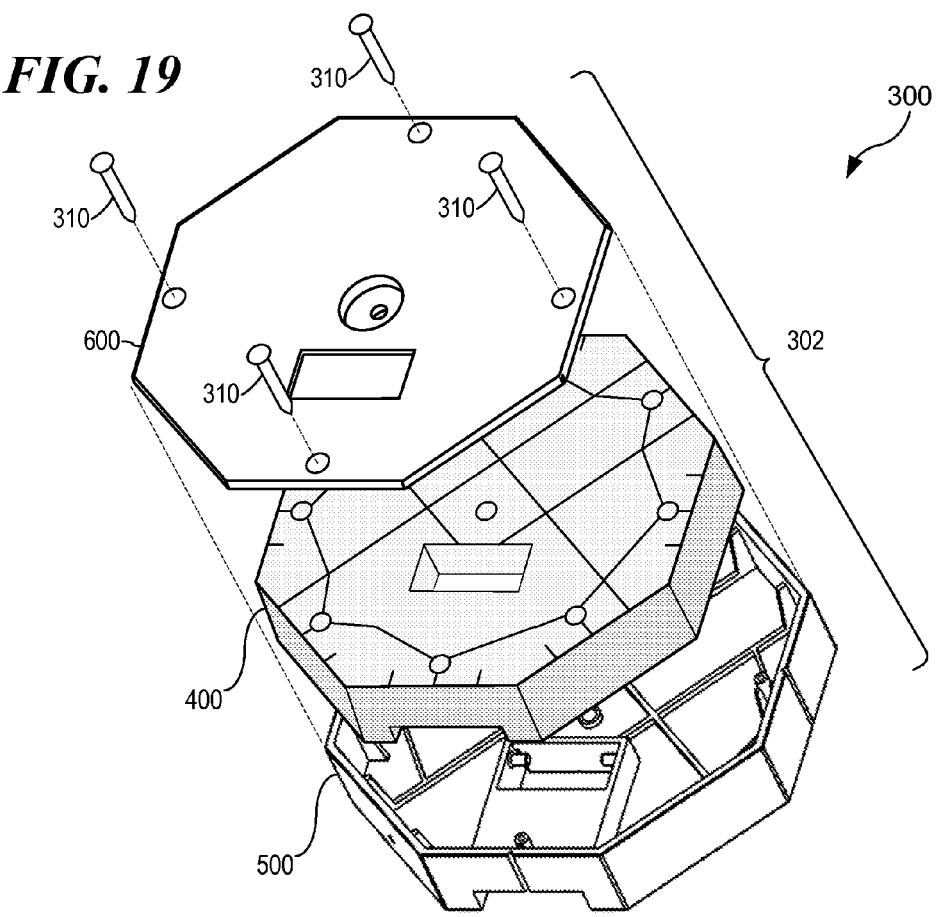
FIG. 19 is a perspective exploded view of a measuring assistance device according to an aspect of the present invention.
Figure 20:
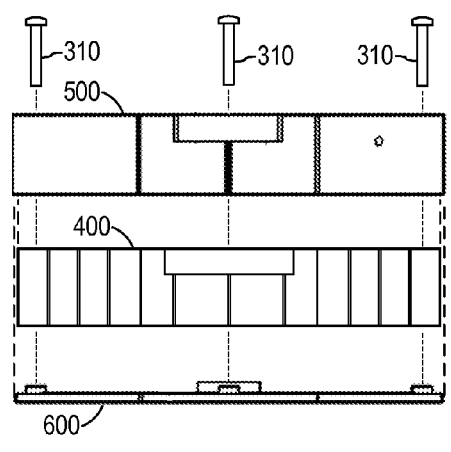
FIG. 20 is a front elevation exploded view of the measuring assistance device in FIG. 19.
Figure 21:
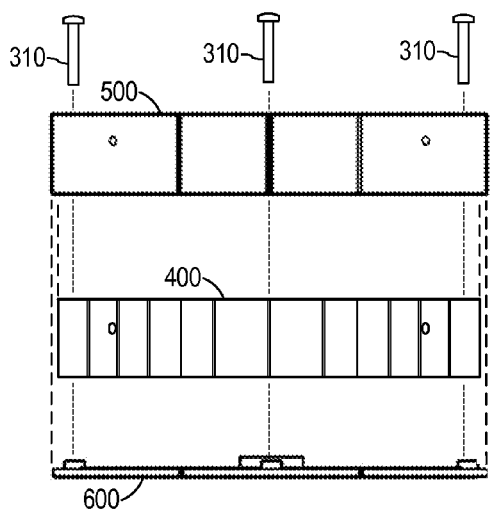
FIG. 21 is a side elevation exploded view of the measuring assistance device in FIG. 19.

Turning now to FIGS. 19-21, in another embodiment a measuring assistance device 300 may comprise a body 302 having a regular, polygonal shape, such as an octagon, when viewed from above, but the body 302 may be made of durable, non-metallic components having sufficient mass that the body 302 will weigh approximately 15, or within the range of 14 to 16 pounds. More particularly, the body 302 may comprise a massive core 400 made of a suitably massive material such as iron, for example, enclosed within a plastic top cover 500 and a plastic bottom cover 600. The core 400 should preferably have sufficient mass and surface area that the device 300 will resist being moved while measurements are taken with one end of a measuring tape secured to the device 300. Preferably, the inertia of the device, together with friction between the device and an underlying surface, should be more than the force exerted by an extended measuring tape will normally overcome. The core 400 may be inserted into the top cover 500, in proper orientation, and the bottom cover 600 may be secured to the top cover 500 using suitable mechanical fasteners, such as screws 310. Alternatively, the bottom cover 600 may be secured to the top cover 500 using a suitable adhesive material.

Figure 22:
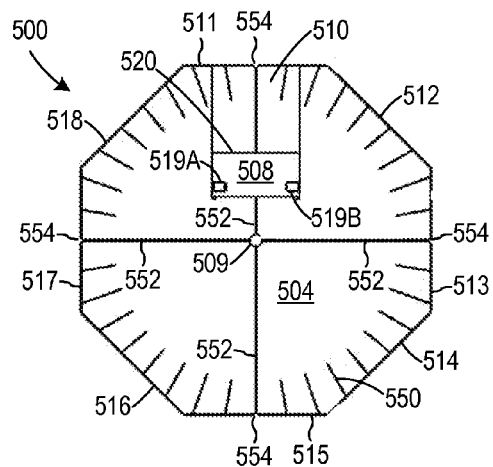
FIG. 22 is a top view of the measuring assistance device in FIG. 19.
Figure 23:
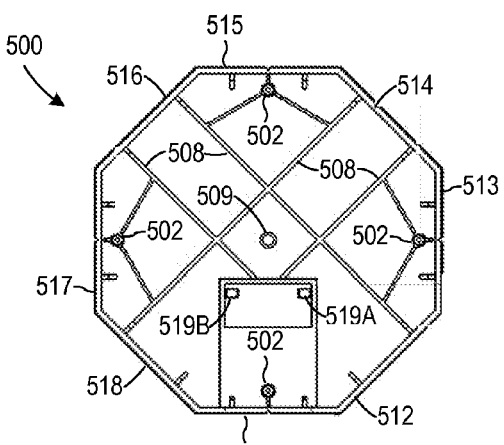
FIG. 23 is a bottom view of a top cover.
Figure 24:
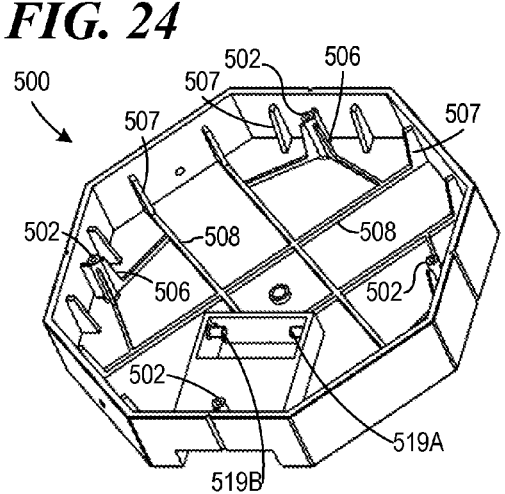
FIG. 24 is a perspective view of a top cover.

Turning now to FIGS. 22-24, the top cover 500 may be any regular polygonal shape, and may for convenience be shaped as a regular octagon in an embodiment. The top cover 500 may have a generally planar top surface 504 and eight generally planar side surfaces 511-518. In an embodiment, the top cover 500 may be eight inches across from one flat side to an opposite flat side, and may be approximately one-and-one-half inches tall. The underside of the top cover 500 may be open to receive the core 400 (FIG. 19) and may be provided with certain features on the underside. The top cover 500 may have a center hole 509 located approximately halfway between any two opposite side surfaces. A recessed area 510 may be provided adjacent one of the generally planar side surfaces 511-518 and adjacent to a rectangular aperture 508 located off center of the top cover 500. The recessed area 510 may extend from a first side surface 511 towards the center 509 and may adjoin the rectangular aperture 508 at a designated edge 520. A pair of bosses 519A and 519B may be provided on either side of rectangular aperture 508 for mounting a releasable clamping device, such as clamping device 122 as shown in FIG. 1.

In an embodiment, and as shown in FIG. 22, the top surface 504 of top cover 500 may be provided with markings 550 around a perimeter of the top cover 500. The markings 550 may be painted on the top surface 504, and/or the markings 550 may be raised or depressed areas formed into the top surface 504 in the form of ridges or grooves, respectively. The markings 550 may indicate a bearing from the center hole 509 of device 300, in the direction in which a measurement is to be taken. In an embodiment, the 36 markings 550 may be made evenly around the perimeter of top cover 500, indicating 10 degree increments. In an embodiment, four of the markings 552 may be a subset of the markings 550 and may be spaced apart in 90 degree increments, may extend from the perimeter to the center 509 to be distinguishable from the other markings, and may be used to indicate four cardinal directions. An embodiment of the top cover 500 provides small grooves 554 formed in side surfaces 511, 513, 515, and 517, adjacent the four markings 552.

In an embodiment, and as shown in FIGS. 23-24, the top cover 500 may be provided with certain features on the underside. A plurality of bosses 502 may extend downward from the underside of top surface 504 toward an opening to be closed and secured by bottom cover 600 (FIG. 19). Bosses 502 may be configured to receive mechanical fasteners such as screws 310 (FIG. 19) for securing the bottom cover 600 to the top cover 500. In an embodiment, the bosses 502 may be disposed symmetrically around the center 509 and near the perimeter of the top cover 500. Rib members 508, comprising narrow, raised portions of the underside of top surface 504, may extend across the underside between any two opposite side surfaces 511-518. Additional rib members 506, extending vertically along bosses 502 may also extend from bosses 502 along the underside of top surface 504 and intersect with rib members 508. The rib members 506 and 508 may be provided for coupling with corresponding grooves formed into the massive core 400 (FIG. 19), and may prevent the core 400 from shifting position within the plastic covers 500 and 600. The vertical portions of rib members 506 may provide reinforcement of the bosses 502 and help to maintain vertical alignment of the bosses 502. Additional buttress members 507 may be formed adjacent the side surfaces 511-518, on the inside of the top cover 500 as shown in FIG. 24, and may provide reinforcement of the side surfaces 511-518.

Figure 25:
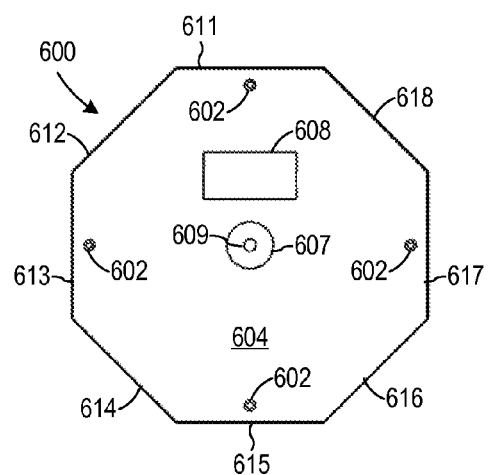
FIG. 25 is bottom view of a bottom cover.
Figure 26:
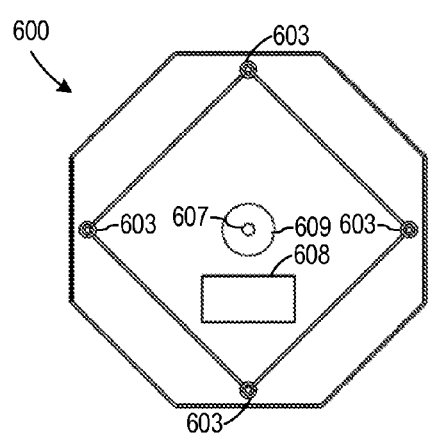
FIG. 26 is a top view of a bottom cover.
Figure 27:
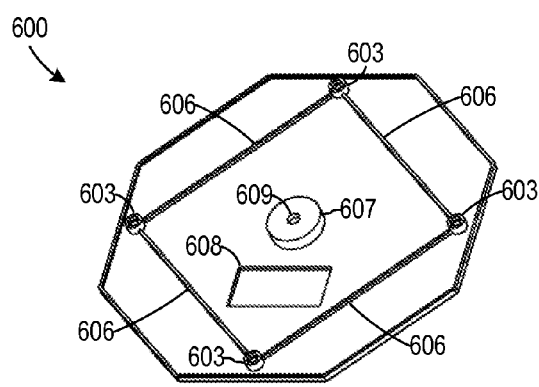
FIG. 27 is a perspective view of a bottom cover.

Turning now to FIGS. 25-27, the bottom cover 600 may be any regular shape, and may for convenience be shaped as a regular octagon in an embodiment. The bottom cover 600 may have a generally planar bottom surface 604 and eight generally planar side surfaces 611-618. In an embodiment, the bottom cover 600 may be eight inches across from one flat side to an opposite flat side, and may be only a fraction of an inch tall. The topside of the bottom cover 600 may be provided with certain features. The bottom cover 600 may have a center hole 609 located approximately halfway between any two opposite side surfaces. A circular recess 607 surrounding the center hole 609 may have a diameter greater than the diameter of center hole 609 for receiving a bottom post 130 (FIGS. 6A-6B) as described previously. A rectangular aperture 608 may be located off center of the bottom cover 600 and in registration with the rectangular aperture 508 (FIG. 22) in top cover 500. A plurality of circular apertures 602 may be formed in the bottom cover 600, and may be disposed symmetrically around the center 609 and near the perimeter of the bottom cover 600. The circular apertures may be located in registration with bosses 502 (FIGS. 23-24) of top cover 500 for securing the bottom cover 600 to the top cover 500 using mechanical fasteners such as screws 310 (FIG. 19). Rib members 606, comprising narrow, raised portions of the topside of bottom surface 604, may extend across the topside between any two circular bosses 603 surrounding the circular apertures 602. The rib members 606 may be provided for strengthening the bottom cover 600.

Figure 28:
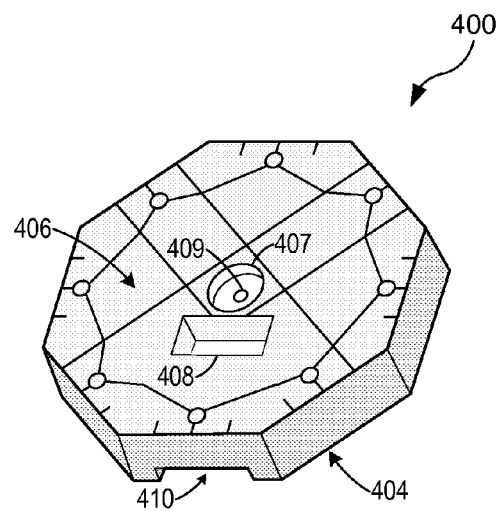
FIG. 28 is a perspective view of a core.
Figure 29:
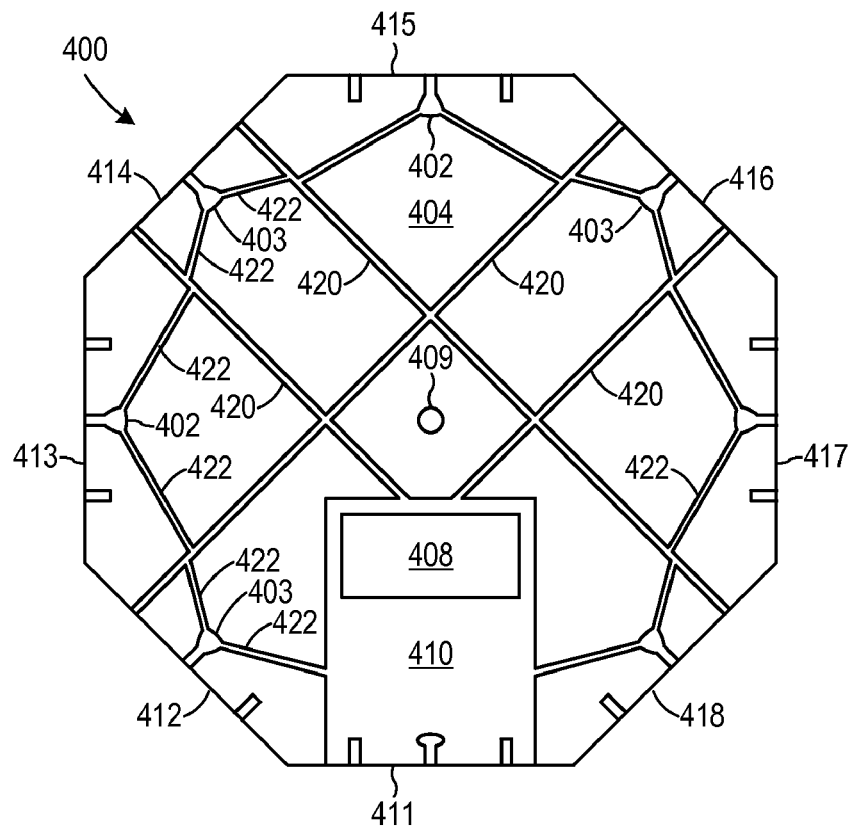
FIG. 29 is a top view of a core.
Figure 30:
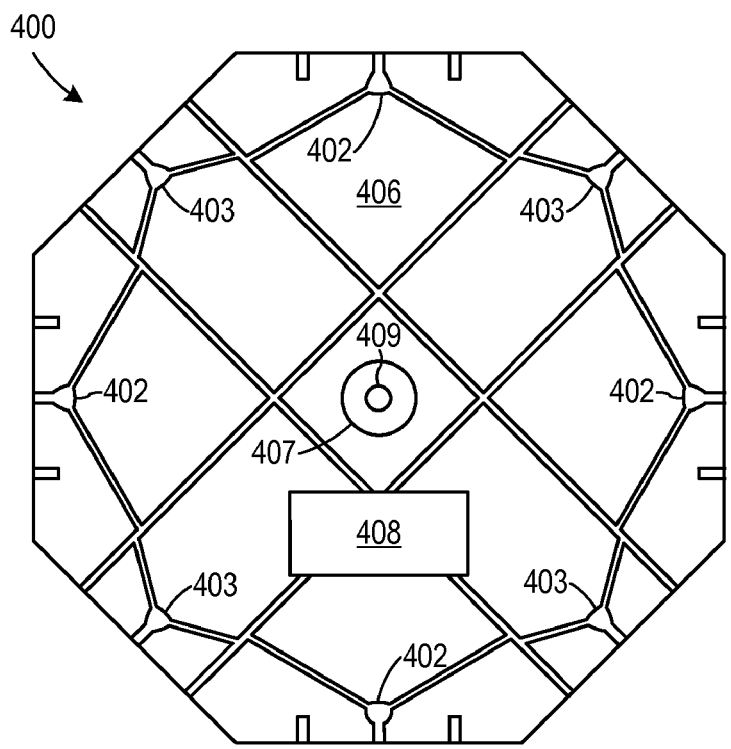
FIG. 30 is a bottom view of a core.

Turning now to FIGS. 28-30, the massive core 400 may be any regular polygonal shape, and may for convenience be shaped as a regular octagon in an embodiment. The core 400 may have a generally planar top surface 404, a generally planar bottom surface 406, and eight generally planar side surfaces 411-418. In an embodiment, the core 400 may be less than eight inches across from one flat side to an opposite flat side, and may be less than one-and-one-half inches tall to fit within the top cover 500 and the bottom cover 600. The core 400 may have a center hole 409 located approximately halfway between any two opposite side surfaces and extending through the core 400. A circular recess 407 in bottom surface 406 surrounding the center hole 409 may have a diameter greater than the diameter of center hole 609 in bottom cover 600 for receiving a bottom post 130 (FIGS. 6A-6B) as described previously. A rectangular aperture 408 may be located off center of the core 400 and in registration with the rectangular aperture 508 (FIG. 22) in top cover 500 and the rectangular aperture 608 in bottom cover 600. A recessed area 410 may be provided adjacent one of the generally planar side surfaces 411-418 and adjacent to a rectangular aperture 408 located off center of the core 400. In an embodiment, a plurality of horizontal grooves 420 may be formed in the top surface 404 of core 400 and in the bottom surface 406 of core 400. The horizontal grooves 420 may extend across the top surface 404 between any two opposite side surfaces 411-418, and may extend across the bottom surface 406 between any two opposite side surfaces 411-418. A plurality of holes 402 may be formed through the core 400 from top surface 404 to bottom surface 406, and may be disposed symmetrically around the center 409 and near the perimeter of the core 400 adjacent side surface 411, 413, 415, and 417. The holes 402 may be located in registration with bosses 502 (FIGS. 23-24) of top cover 500 and with circular apertures 602 (FIG. 25) of bottom cover 600 for securing the bottom cover 600 to the top cover 500 using mechanical fasteners such as screws 310 (FIG. 19). Additional holes 403 may be provided in corresponding locations adjacent side surfaces 412, 414, 416, and 418, and may be disposed symmetrically around the center 409 and near the perimeter of the core 400. A plurality of additional horizontal grooves 422 may extend from one of the holes 402 or 403 to intersect one of horizontal grooves 420. In an embodiment, and as shown in FIGS. 29-30, the additional horizontal grooves 422 may extend from one hole 402 or 403 in a first direction to intersect one groove 420 and in a second direction to intersect another groove 420.

Figure 31:
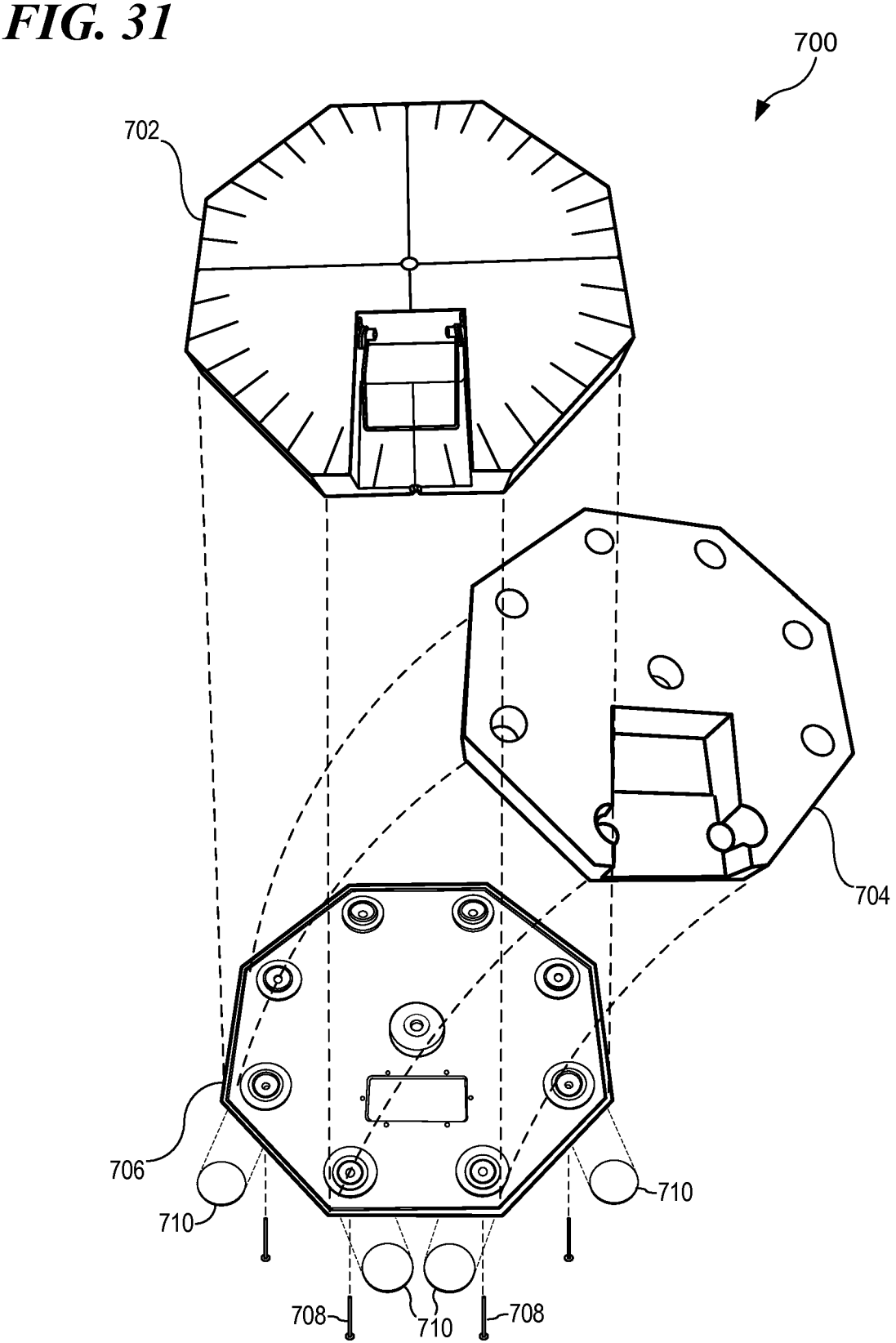
FIG. 31 is a perspective exploded view of a measuring assistance device according to an aspect of the present invention.

Turning now to FIGS. 31-37, in an embodiment a measuring assistance device 700 may comprise a top cover 702, a massive core 704, and a bottom cover 706, each having a regular, polygonal shape, such as an octagon as shown in FIG. 31. The top cover 702 and the bottom cover 706 may each be made of durable, non-metallic materials. The massive core 704 may be made of a suitably massive material such as iron, for example, having sufficient mass that the device 700 will weigh approximately 15 pounds, or within the range of 14 to 16 pounds. The core 704 should preferably have sufficient mass that the device 700 will resist being moved while measurements are taken with one end of a measuring tape secured to the device 700. Preferably, the inertia of the device, together with friction between the device and an underlying surface, should be more than the force exerted by an extended measuring tape will normally overcome. In an embodiment, the massive core 704 may be placed on the bottom cover 706, in proper orientation, and the top cover 702 may be placed over the core 704, also in proper orientation. The top cover 702 may be secured to the bottom cover 706 using mechanical fasteners 708, such as screws. The core 704 may thereby be enclosed with the top cover 702 and the bottom cover 706. In an embodiment, rubber feet 710 may be applied to the underside of the bottom cover 706. In another embodiment, the mechanical fasteners, such as screws, may also be used to secure rubber feet 710 to the underside of the bottom cover 706. In an embodiment, rubber feet 710 may be secured to the underside of the bottom cover 706 using a waterproof adhesive. In operation, eight rubber feet 710, each having a diameter in the range of 1.0-1.5 in., and having a collective surface area in the range of 25-38 sq. in., may enhance friction between the device 700 and an underlying surface such that the device 700 and the rubber feet 710 resist slipping or sliding on a damp or wet floor.

Figure 32:
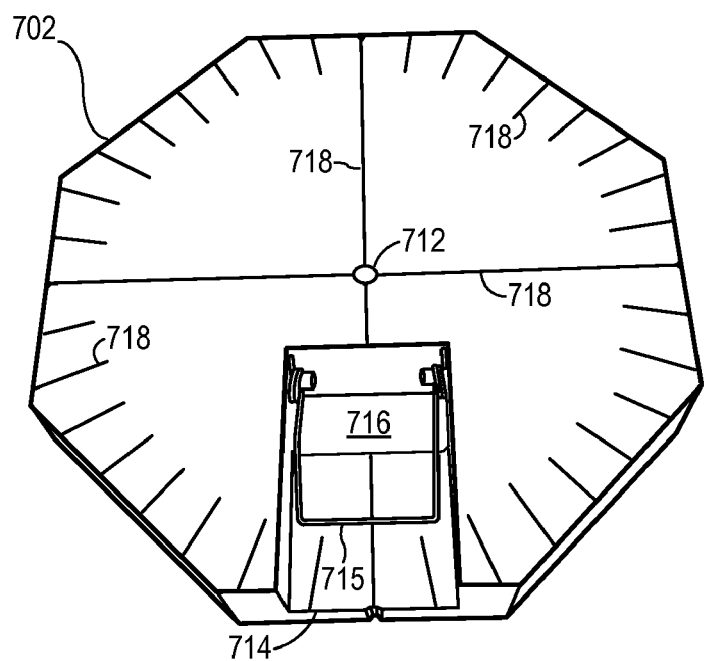
FIG. 32 is a top view of a top cover.
Figure 33:
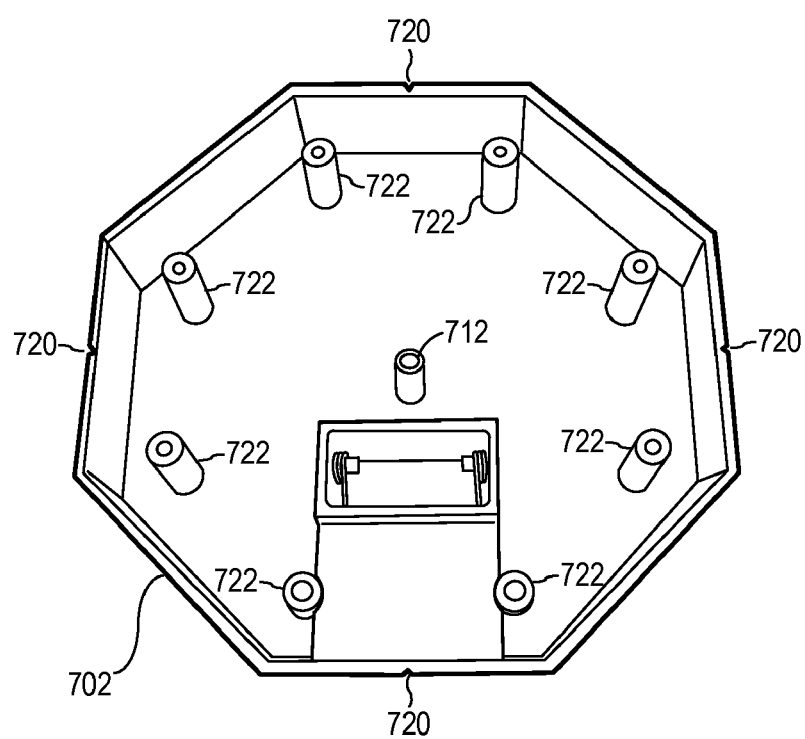
FIG. 33 is a bottom view of a top cover.

As shown in FIGS. 32-33, the top cover 702 may have a generally octagonal shape, and may have a center hole 712. A recessed area 714 may be provided adjacent a generally planar side surface, and adjacent to a rectangular aperture 716 located off center of the top cover 702. A clamping device 715 may be provided within the recessed area 714, and may comprise a coiled wire spring having a U-shaped portion extending in the direction of the recessed area 714 for a sufficient distance to reach a surface of the recessed area 714. In this example, clamping device 715 may be configured like the spring-loaded wire in a typical mouse trap. Top cover 702 may further be provided with markings 718 indicating a bearing from the center hole 712 of device 700 in the direction in which a measurement is to be taken, as described above with respect to FIG. 22. The top cover 702 may also be provided with small grooves 720 formed in side surfaces of top cover 702, corresponding to certain cardinal markings on a top surface of top cover 702, as described above.

As shown in FIG. 33, the top cover 702 may be provided with certain features on the underside. A plurality of bosses 722 may extend downward from the underside of the top surface and toward an opening to be closed and secured by bottom cover 706 (FIG. 31). Bosses 722 may be configured to receive mechanical fasteners such as screws 708 (FIG. 31) for securing the bottom cover 706 to the top cover 702, and may be internally threaded as a part of that configuration. In an embodiment, the bosses 722 may be disposed symmetrically around the center hole 712 and near the perimeter of the top cover 702. A central boss 724 may extend from the center hole 712 downward from the underside of the top surface and may be hollow through the middle to permit passage of a top post as described above with respect to FIG. 5 and to FIGS. 6A-6B, for example.

Figure 34:
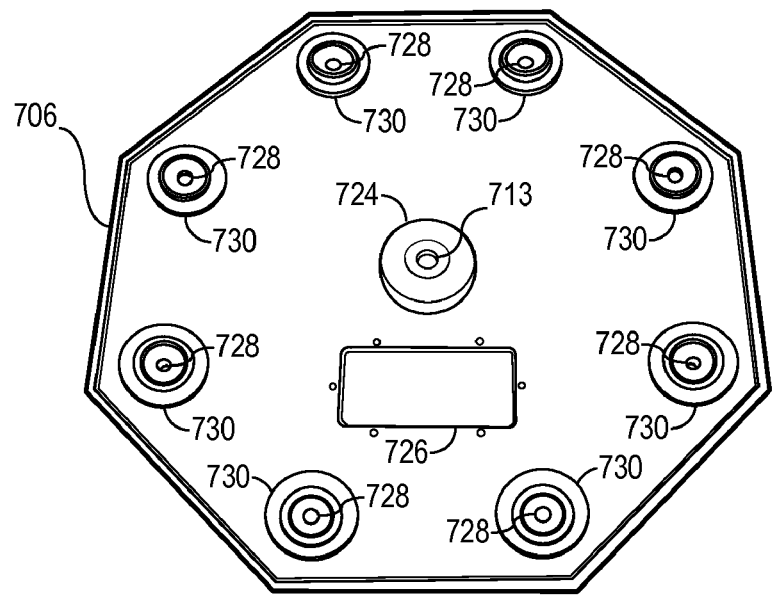
FIG. 34 is a top view of a bottom cover.
Figure 35:
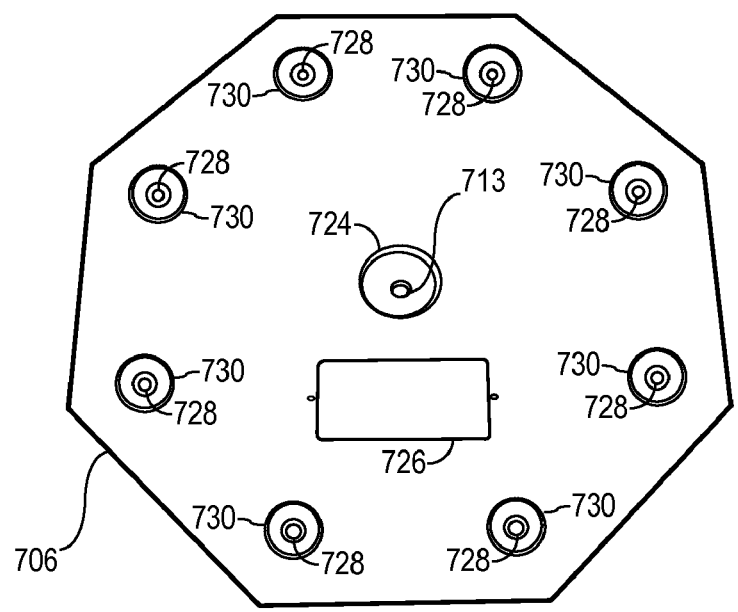
FIG. 35 is a bottom view of a bottom cover.

Turning now to FIGS. 34-35, a bottom cover 706 may be any regular shape, and may for convenience be shaped as a regular octagon in an embodiment. The bottom cover 706 may have a center hole 713 located approximately halfway between any two opposite side surfaces. A circular recess 724 surrounding the center hole 712 may have a diameter greater than the diameter of center hole 713 for receiving a bottom post 130 (FIGS. 6A-6B) as described previously. A rectangular aperture 726 may be located off center of the bottom cover 706 and in registration with the rectangular aperture 716 (FIG. 32) in top cover 702. A plurality of circular apertures 728 may be formed in the bottom cover 706, and may be disposed symmetrically around the center 713 and near the perimeter of the bottom cover 706. The circular apertures may be located in registration with bosses 722 (FIG. 33) of top cover 702 for securing the bottom cover 706 to the top cover 702 using mechanical fasteners such as screws 708 (FIG. 31). Each of the circular apertures 728 may be surrounded by a circular recessed area, or cup, 730 for receiving a rubber foot 710 (FIG. 31). The circular apertures 728 are provided to permit passage of a mechanical fastener, such as screw 708 (FIG. 31) for securing the bottom cover 706 to the top cover 702, in which screws 708 may be threaded into bosses 722 (FIG. 33).

Figure 36:
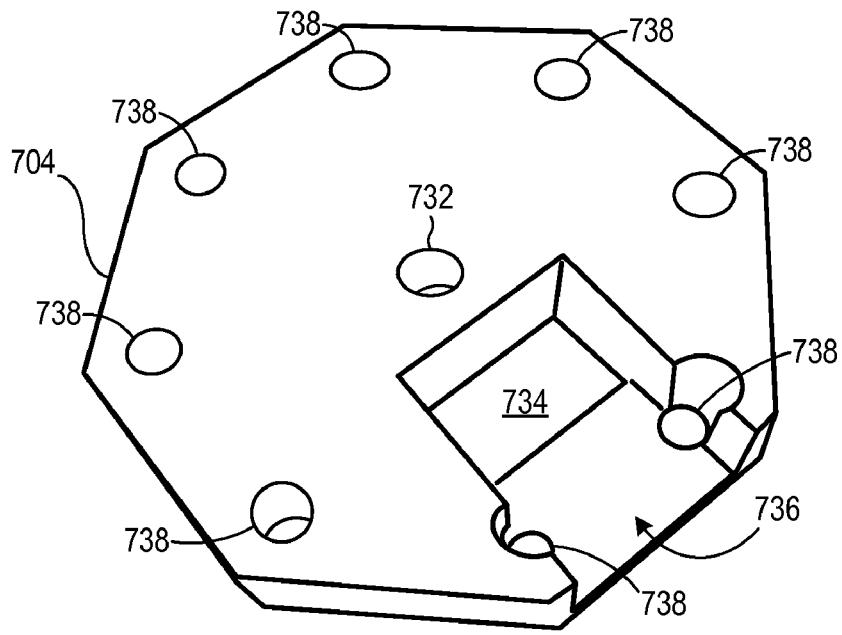
FIG. 36 is a top view of a core.
Figure 37:
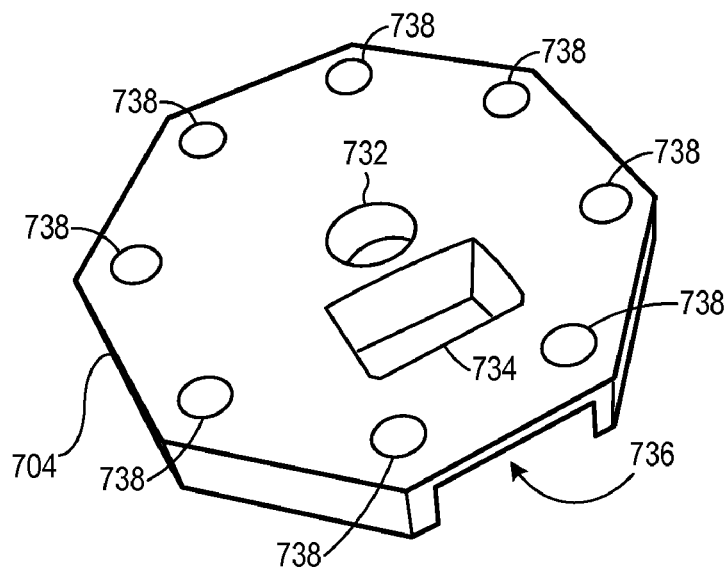
FIG. 37 is a bottom view of a core.

Turning now to FIGS. 36-37, a core 704 may be any regular polygonal shape, and may for convenience be shaped as a regular octagon in an embodiment. The core 704 may have a center hole 732 located approximately halfway between any two opposite side surfaces and extending through the core 704. A rectangular aperture 734 may be located off center of the core 704 and in registration with the rectangular aperture 716 (FIG. 32) in top cover 702 and the rectangular aperture 726 in bottom cover 706. A recessed area 736 may be provided adjacent one of the sides and adjacent to the rectangular aperture. A plurality of holes 738 may be formed through the core 704 from a top surface to bottom a surface, and may be disposed symmetrically around the center 732 and near the perimeter of the core 704 adjacent the sides. The holes 738 may be located in registration with bosses 722 (FIG. 33) of top cover 702 and with circular apertures 728 and circular recesses 730 (FIG. 34) of bottom cover 706 for securing the bottom cover 706 to the top cover 702 using mechanical fasteners such as screws 708 (FIG. 31).

Figure 38:
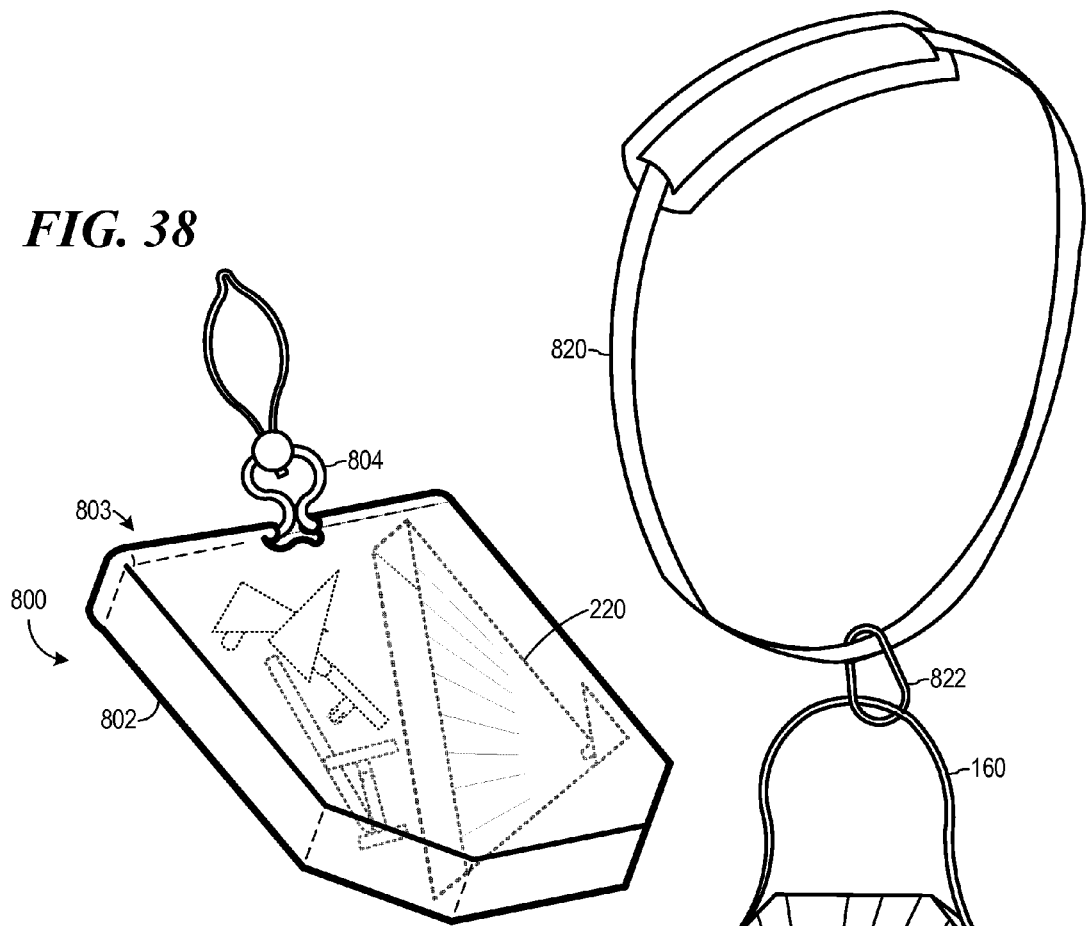
FIG. 38 is a perspective view of a carrying pouch for a measuring assistance device.

Turning now to FIG. 38, corner adapter 200 and all posts, may be carried within a carry pouch 800. The carry pouch 800 may comprise a flexible bag 802 made of cloth, canvas, or other flexible material, having an opening 803 and a drawstring 804. The bag 802 may be large enough to contain the corner adapter and all posts.

Figure 39:
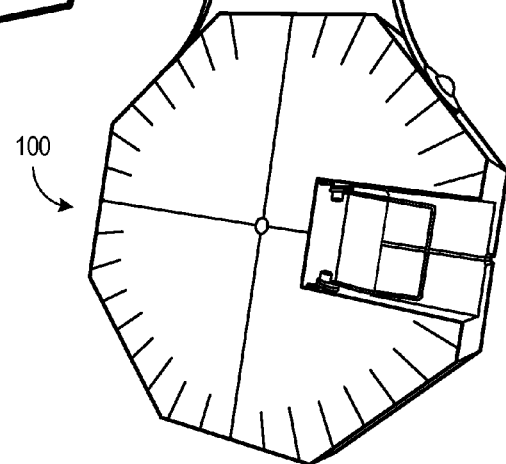
FIG. 39 is a perspective view of a measuring assistance device and a shoulder strap.

Turning now to FIG. 39, a measuring assistance device, such as device 100, device 300, or device 700, may be coupled to a shoulder strap 820 via a carabineer 822 linked around the shoulder strap 820 and the handle 160 of device 100, for example. A device 300 or a device 700 may also have a handle 160. The carry pouch 800 may also be coupled to the shoulder strap 820 by hooking the drawstring 804 to carabineer 822.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A measuring assistance device, comprising:
   a body, having a shape, and having a cavity extending therethrough from a top surface to a bottom surface;
   a recessed area on the top surface adjacent the cavity extending from the cavity to a perimeter of the body;
   a designated edge between the cavity and the recessed area located a predetermined distance from an opposite perimeter; and
   a clamping device at the recessed area.

2. The apparatus of claim 1, further comprising a center hole extending through the body from the top surface to the bottom surface.

3. The apparatus of claim 2, further comprising:
   a top post, having a shaft portion and a plate portion, wherein the shaft portion is insertable through the center hole from the top surface of the body;
   a bottom post, having a shaft portion and a disk portion, wherein the shaft portion is insertable through the center hole from the bottom surface of the body;
   wherein the top post and the bottom portion can be coupled together to form a center post unit.

4. The apparatus of claim 2, further comprising a center stake configured as a metal rod having a point at a first end, wherein the center stake is insertable through the center hole from the top surface of the body.

5. The apparatus of claim 4, wherein the center stake and the top post can be coupled together to form a center post unit.

6. The apparatus of claim 1, further comprising a flexible strap secured to the body at one or more locations, forming a handle for carrying the measuring assistance device.

7. The apparatus of claim 1, further comprising a bottom cover, wherein the bottom cover is made of a resilient material having a shape corresponding to the shape of the body, and wherein the bottom cover has a bottom portion and a plurality of side portions.

8. The apparatus of claim 7, wherein the resilient material is rubber.

9. The apparatus of claim 1, further comprising a plurality of markings on the top surface, wherein any two of the markings indicate an angle between the two markings with respect to a center of the top surface.

10. The apparatus of claim 1, further comprising one or more grooves formed in side surfaces of the body, and wherein the one or more grooves extend from the top surface to the bottom surface.

11. The apparatus of claim 1, further comprising a corner adapter, the corner adapter comprising a planar top portion having a triangular shape, a planar bottom portion having a triangular shape, and at least a planar first side portion extending between the top portion and the bottom portion, wherein the top portion, the bottom portion, and the first side portion define an interior volume.

12. The apparatus of claim 11, further comprising a bottom post having a shaft portion fixedly secured to the planar top portion near a corner of the top portion.

13. The apparatus of claim 12, further comprising a top post having a shaft portion and a plate portion, wherein the top post and the bottom portion can be coupled together.

14. The apparatus of claim 11, further comprising a plurality of markings on a surface of the top portion, wherein any two of the markings indicate an angle between the two markings with respect to a corner of the adapter.

15. The apparatus of claim 1, wherein the body comprises a massive core enclosed within a cover.

16. The apparatus of claim 15, wherein the cover comprises a top portion and a separate bottom portion.

17. The apparatus of claim 16, further comprising a plurality of markings on a top surface of the top portion of the cover, wherein any two of the markings indicate an angle between the two markings with respect to a center of the top surface.

18. The apparatus of claim 16, further comprising one or more grooves formed in side surfaces of the cover, and wherein the one or more grooves extend from a top surface of the cover to a bottom surface of the cover.

19. The apparatus of claim 15, further comprising a center hole extending through the core and through the cover from the top surface of the cover to the bottom surface of the cover.

20. The apparatus of claim 19, further comprising:
  a top post, having a shaft portion and a plate portion, wherein the shaft portion is insertable through the center hole from the top surface of the body;
  a bottom post, having a shaft portion and a disk portion, wherein the shaft portion is insertable through the center hole from the bottom surface of the body;
  wherein the top post and the bottom portion can be coupled together to form a center post unit.

21. The apparatus of claim 19, further comprising a center stake configured as a metal rod having a point at a first end, wherein the center stake is insertable through the center hole from the top surface of the body.

22. The apparatus of claim 21, wherein the center stake and the top post can be coupled together to form a center post unit.

23. The apparatus of claim 15, wherein the clamping device comprises a coiled wire spring.

24. The apparatus of claim 15, further comprising one or more friction-enhancing devices affixed to a bottom surface of the cover.

25. The apparatus of claim 24, wherein the one or more friction-enhancing devices are made of a resilient material.

26. The apparatus of claim 25, wherein the resilient material is rubber.

* * * * *